(12) United States Patent
Hradecky

(10) Patent No.: US 7,638,740 B1
(45) Date of Patent: Dec. 29, 2009

(54) BITE-SIZED WAFFLE MAKING ASSEMBLY AND BITE-SIZED WAFFLE PRODUCED THEREBY

(76) Inventor: Veronica Hradecky, 1305 Caldwell Dr., Garland, TX (US) 75041

( * ) Notice: Subject to any disclaimer, the term of this patent is extended or adjusted under 35 U.S.C. 154(b) by 780 days.

(21) Appl. No.: 11/139,755

(22) Filed: May 27, 2005

(51) Int. Cl.
*H05B 3/06* (2006.01)
(52) U.S. Cl. .......................... 219/524; 219/520; 99/332
(58) Field of Classification Search .................. None
See application file for complete search history.

(56) References Cited

U.S. PATENT DOCUMENTS

| | | | |
|---|---|---|---|
| 1,336,734 | A | 4/1920 | De Graff |
| 1,553,989 | A | 9/1925 | Cook |
| D237,935 | S | 12/1975 | Nygren |
| 3,999,473 | A | 12/1976 | Carbon |
| 4,026,202 | A | 5/1977 | Szpur |
| 4,075,940 | A | 2/1978 | Carbon |
| 4,935,252 | A | 6/1990 | Huang et al. |
| D309,549 | S | 7/1990 | Stephens |
| 5,079,015 | A | 1/1992 | Herting |
| 5,256,431 | A | 10/1993 | Herting |
| D345,487 | S | 3/1994 | Vitantonio |
| 5,299,492 | A | 4/1994 | Carbon et al. |
| D373,452 | S | 9/1996 | Gobble et al. |
| 5,596,922 | A | 1/1997 | Chan |
| 5,636,564 | A | 6/1997 | Weiss |
| D392,153 | S | 3/1998 | Wright |
| 5,937,742 | A | 8/1999 | Steeb et al. |
| 5,983,784 | A | 11/1999 | Goldberg |
| 6,167,796 | B1 | 1/2001 | Wright et al. |
| D440,737 | S | 4/2001 | Johnson et al. |
| D445,238 | S | 7/2001 | Sotovia |
| 6,412,400 | B1 | 7/2002 | Gambino et al. |
| 6,860,191 | B2 | 3/2005 | Jackson et al. |

*Primary Examiner*—Thor S Campbell
(74) *Attorney, Agent, or Firm*—Baker Botts L.L.P.

(57) ABSTRACT

A waffle making assembly for the creation of a plurality of bite-sized waffles, wherein said bite-sized waffles have the necessary dimensional qualities to enable the consumption thereof without having been previously severed into multiple pieces. The waffle making assembly comprises an upper and lower plate, each having an inner surface with a cavity formed therein such that the cavities form a chamber for the creation of a waffle matrix when the inner surfaces of each plate lie adjacent each other. Easy separation of individual bite-sized waffles from the waffle matrix is enabled by tear portions formed in the upper and lower surfaces of the waffle matrix. The tear portions are formed in the waffle matrix during the cooking operation by a plurality of partitioning flanges defined by lattices in the upper and lower cavities, which sub-divides the cavity into a plurality of smaller sub-cavities. Means are disclosed that enable the creation of contiguously alignable bite-sized waffles having triangular, rectangular, hexagonal, or the like type outer peripheral shapes as well as non-contiguously alignable bite-sized waffles such as those having a circular, or oval type outer peripheral shape.

10 Claims, 5 Drawing Sheets

BITE-SIZED WAFFLE MAKING ASSEMBLY AND BITE-SIZED WAFFLE PRODUCED THEREBY

CROSS-REFERENCE TO RELATED APPLICATIONS

Not applicable.

FIELD OF THE INVENTION

This invention relates to edible waffles and waffle making devices, and more particularly, to a waffle making assembly for the creation of at least one bite-sized waffle, wherein the dimensional qualities of said bite-sized waffle enables the consumption thereof by a user without the necessity of cutting or severing thereof by a typical eating utensil such as a fork or knife

BACKGROUND OF THE INVENTION

Waffles comprise an ever popular and easily prepared type of food product, which is typically consumed during the breakfast meal. The typical waffle is generally made from a batter having an initially amorphous, fluid-like consistency, which is cooked in between two opposing plates in order to form a generally flat, planar-shaped product having depressions formed in the upper and lower surfaces thereof that gives the waffle its characteristic shape as well as to provide a containment means for other complementary condiment items such as butter or syrup. The batter, from which the waffle is made, generally includes a mixture of flour, eggs, milk or water, oil, baking powder, and may optionally include several other ingredients that serves to enhance the taste or texture thereof.

Due to the popularity of the waffle as a consumable food item, many different types of waffle making devices have been proposed that have enabled the formation of waffles having different shapes and sizes. For example, the most commonly known type of waffle shape is flat in shape and has a generally circular periphery and is made from a waffle maker such as disclosed in U.S. Pat. No. 6,412,400 to Gambino. Examples of other waffle makers include Pat. No. D237,935 to Nygren, U.S. Pat. No. 1,553,989 to Cook, and U.S. Pat. No. 6,860,191 to Jackson, et al., which are each adapted to create a waffle product having a rectangular, diamond or heart, and elongated stick outer peripheral shape respectively. Nevertheless, a major drawback of each of these waffle dimensional qualities, as well as any other type of waffle shapes known to the inventor, is that the waffle product is too large to be consumed without having been previously cut into smaller consumable pieces.

The requirement of sectioning the conventional waffle into a plurality of smaller consumable portions by the user or consumer of the waffle, creates several salient drawbacks. First, the consistency of most conventional waffles is such that a relatively large force by the user is required to cut thereinto using the edge of a typical fork. To alleviate this problem, users not having sufficient overall hand or arm strength typically revert to the use of a table knife in order to section the waffle product into smaller bite-sized manageable pieces, a practice that is clearly burdensome to the user. Another inherent drawback is that condiments such as butter or syrup, which have been deposited within depressions formed in the upper surface of the waffle, invariably flow onto the serving plate upon being cut into by a fork or knife, thereby creating a mess on the plate and thus wasting valuable condiment material.

Thus there has been a long-felt, unsatisfied need for a waffle having dimensional qualities which enables consumption by a user without the necessity of cutting or severing thereof by a typical eating utensil such as a fork or knife, wherein the outer periphery of the waffle incorporates a predetermined outer peripheral geometry which allows multiple waffles to be cooked using a waffle plate having a minimally sized overall surface area.

SUMMARY OF THE INVENTION AND OBJECTIVES

The aforementioned needs as well as other needs are met via a bite-sized waffle making assembly which is adapted to produce a cooked waffle matrix that is easily separable into smaller bite-sized waffles by hand. The bite-sized waffles produced by the assembly are sufficiently small to fit on a typical table utensil such as a conventional fork or tablespoon and thus abate the need for severing thereof with a fork or knife prior to consumption. Hand separation of individual waffles from the waffle matrix are accomplished via co-aligned opposing troughs formed in the upper and lower surfaces of the waffle matrix. Optionally, the interconnection of each of the waffles within the waffle matrix may be accomplished via fillets that are formed by channels or gutters formed in the waffle making assembly.

One aspect of the present invention is a waffle making assembly that may be incorporated into legacy type waffle irons, a waffle cooker having an internal heating-element, or in any other similar type device. The legacy type waffle iron is defined as a waffle making assembly comprising two opposing plates having no internal heating mechanism, and thus requiring external heat such as that of a conventional stovetop for the proper operation thereof. Conversely, the heating-element contained waffle cooker is defined as a waffle making assembly comprising two opposing plates having at least one heating element incorporated therein to provide the necessary heat for the cooking action, wherein it is to understood by those skilled in the art that the prior art is replete with examples which teach this type of design. The waffle making assembly is comprised of an upper plate and a lower plate, wherein each of the plates have a cooking surface having an outer periphery thereof which defines a chamber for the production of a waffle matrix that is adapted to be produced thereby. The upper plate is receivable onto the lower plate such that the contour of the outer periphery of the cooking surface of the upper plate is aligned with the outer periphery of the cooking surface of the lower plate.

Another aspect of the present invention is a bite-sized waffle that is generally hexagonal in shape thereby allowing a waffle size that maximally covers the surface area of the waffle making assembly. Nevertheless, it is to be appreciated that other outer peripheral shapes of the waffle could be realized such as triangles, rectangles, circles, and the like. Furthermore, it is contemplated that other non-contiguously alignable type shapes such as animal shapes that would create an aesthetically alluring appeal to small children could be a valid substitute. A non-contiguously alignable shape is defined as any outer shape of a waffle having non-linear edges or any other shape that does not allow a plurality of waffles to be contiguously formed over a planar surface. For non-contiguously alignable waffle shapes, the preferred means of the cooking multiple bite-sized waffles during a single cooking operation incorporates channels which allows the generally amorphous, uncooked batter to easily flow between adjacent sub-cavities.

It is therefore an object of the present invention to provide a bite-sized waffle that is easier to consume than heretofore known prior art waffles, wherein the dimensional qualities of said bite-sized waffle enables consumption thereof by a user without the necessity of cutting or severing thereof by a typical eating utensil such as a fork or knife.

Another object of the present invention is to provide a bite-sized waffle which is cooked as part of a plurality of bite-sized waffles thereby defining a waffle matrix.

Another related object of the present invention is to provide a bite-sized waffle which is cooked as part of a plurality of bite-sized waffles thereby defining a waffle matrix, wherein said waffle is interconnected to said waffle matrix via at least one hand separable member. Said hand separable member comprising either a fillet or a pair opposing co-aligned troughs formed in the upper and lower surface of said waffle matrix.

Another object of the present invention is to provide a waffle making assembly which is adapted to produce said bite-sized waffle.

These and other objects of the present invention will become readily apparent to those familiar with the construction and use of food and food making products and will become apparent in the following portions of the specification, wherein the detailed description is for the purpose of fully disclosing preferred embodiments of the invention without placing limitations thereon.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers, and wherein.

DETAILED DESCRIPTION OF THE PREFERRED EMBODIMENTS

Figures 1, 2:
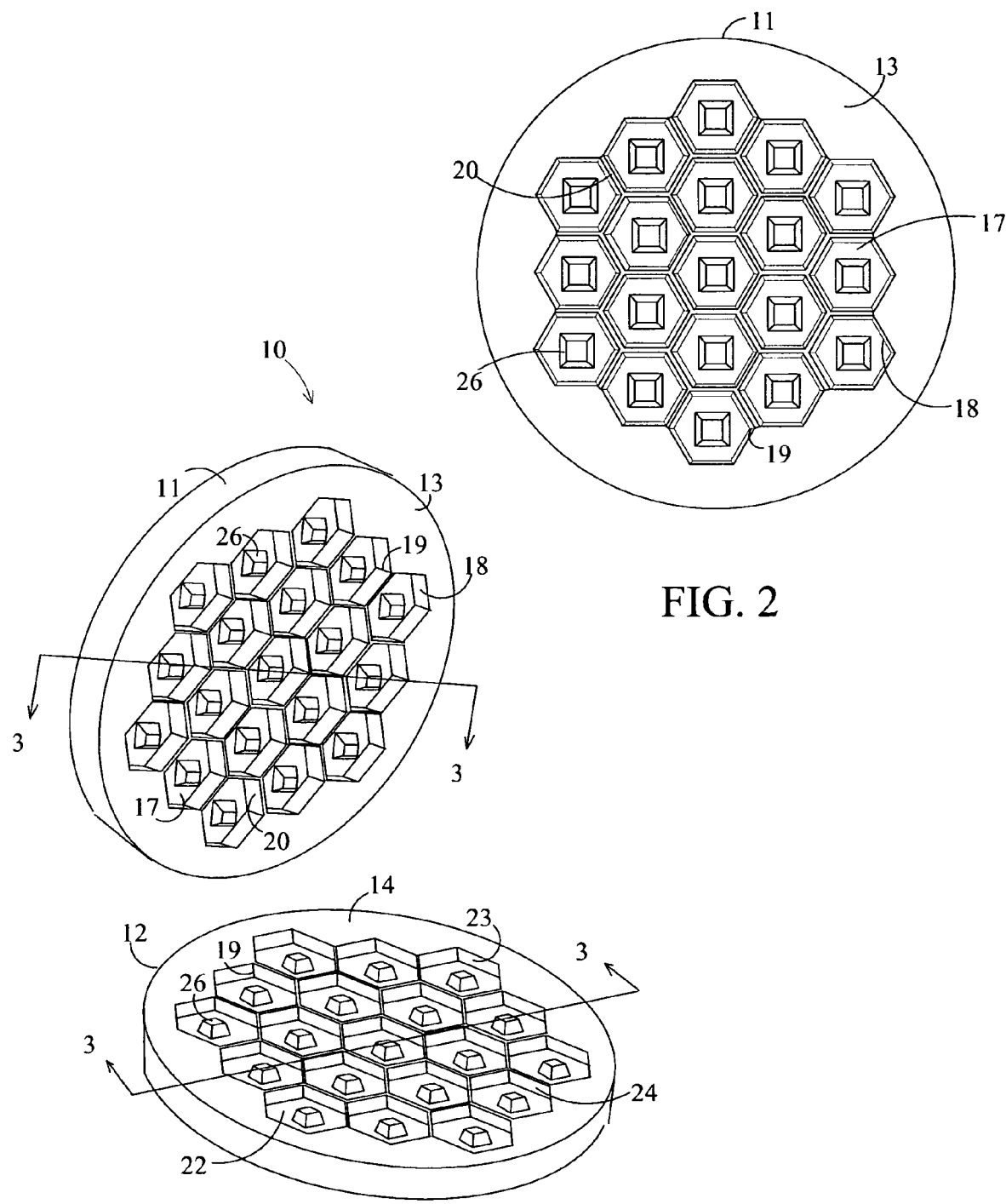
FIG. 1 is a perspective view of one preferred embodiment of the present invention shown with the upper and lower plates in the open position.
FIG. 2 is a bottom plan view of the upper plate of the embodiment of FIG. 1, wherein the top plan view of the lower plate is substantially a mirror image thereof.

Referring now to FIG. 1, a waffle making assembly 10 defining an exemplary embodiment according to the present invention is shown in an open position. The waffle making assembly 10 is comprised of an upper plate 11 and a lower plate 12, each having an inner surface (13, and 14). Both of the inner surfaces have cavities formed therein for receipt of a predetermined amount of waffle batter during a waffle cooking operation. When in the closed position, the cavities define a waffle space for the preparation of a plurality of bite-sized waffles. Although the present embodiment is adapted to produce a plurality of bite-sized waffles during each cooking operation, it is to be appreciated that other waffle making assemblies may be realized which are adapted to only produce a single bite-sized waffle during each cooking operation.

Figure 3:
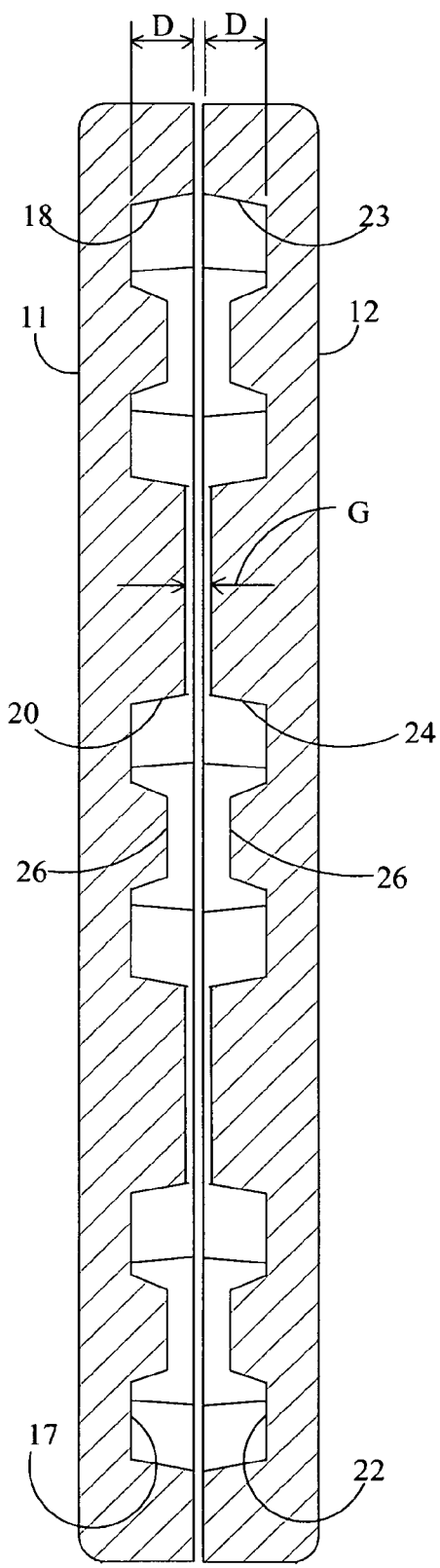
FIG. 3 is an enlarged, elevational, cross-sectional view taken at 3-3 of the embodiment of FIG. 1, wherein the two plates are shown in the closed position.
Figure 6:
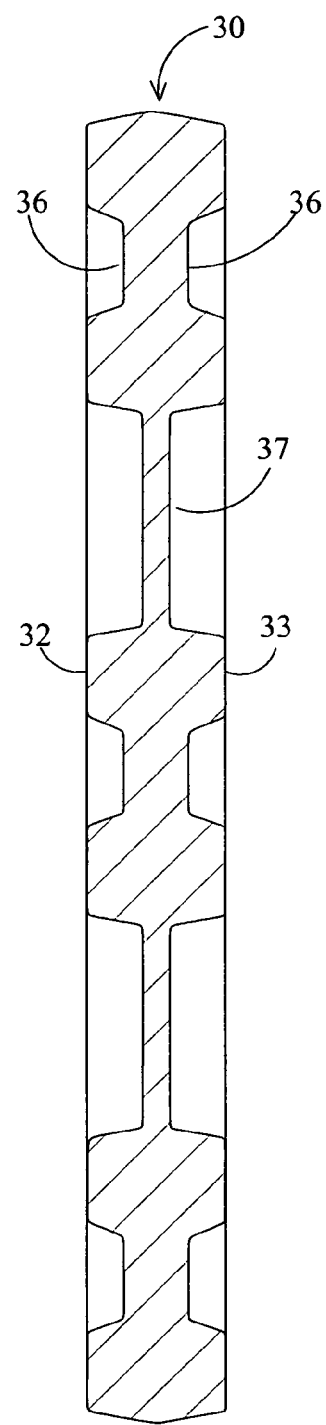
FIG. 6 is an enlarged, elevational, cross-sectional view taken at 6-6 of the waffle matrix of FIG. 4.

The upper cavity within the upper plate 11 comprises a generally planar-shaped cooking surface 17 which is surrounded by a peripheral wall 18 having a predetermined depth D. Encompassed within the peripheral wall 18 are a plurality of partitioning flanges 20 defining a lattice that sub-divides the cavity into a plurality of smaller sub-cavities. The lattice as shown in the present embodiment is adapted to form sub-cavities having a generally hexagonal shape, and extends across the cooking surface such that the outer perimeter 19 thereof is attached to the peripheral wall of the cavity. Each of the partitioning flanges extend generally perpendicularly relative to the cooking surface having a depth that is slightly less the depth D for reasons to be hereinafter described. Accordingly, the lower cavity within the lower plate 12 is essentially similar to the upper cavity, effectively being a mirror image thereof. The lower cavity comprises a generally planar-shaped cooking surface 22 which is surrounded by a peripheral wall 23 having predetermined depth D. The lower cavity also contains a plurality of partitioning flanges 24 defining a lattice, having a depth that is slightly less then the depth D. Peripheral walls (18, and 23) each have a shape that is substantially a mirror image of each other such that when the plates (11, and 12) are moved to the closed position, as shown in FIG. 3, the walls (18, and 23) lie adjacent to each other. Additionally, the lattices defined by the partitioning flanges (20, and 24) traverse across their respective cooking surfaces such that the pattern created thereby is a mirror image of each other. In this manner, each of the partitioning flanges disposed on the upper plate has a corresponding partitioning flange disposed on the lower plate aligned therewith, thereby forming a gap G therebetween when the plates are in the closed position.

Each of the cooking surfaces also has a plurality of frusto-pyramidal shaped depression forming members 26 disposed on the upper and lower cooking surfaces (17, and 22). The depression forming members 26 serve to form at least one depression 36 in each of the upper and lower surface of the bite-sized waffles, thereby giving the prepared waffle its characteristic look and feel. Although the present embodiment describes the use of a depression forming member having a frusto-pyramidal shape, it is to be appreciated that other shapes may be implemented such as cylindrical, frusto-ovular, or the like type shapes. Additionally, it is contemplated that the depression forming members 26 may be in the shape of a graphic image including geometric shapes such as stars, or even animal or human profiles, thereby forming a complementary debossed graphic image on the surface of the waffle product.

Thus, when the plates (11, and 12) are in the closed position, the upper and lower cooking surfaces (17, and 22), and peripheral walls (18, and 23) together with the partitioning flanges (20, and 24) and depression forming members 26 define a chamber for the preparation of the waffle matrix using conventional waffle cooking techniques. The distance of the depth D of the upper cavity plus the depth D of the lower cavity essentially determines overall thickness of the cooked waffle product. Whereas the present embodiment is described with upper and lower cavities having substantially similar depth D, this is not a necessary limitation to the proper operation of the present invention. That is, the lower cavity may have a depth which is shallower or deeper than the depth of the upper cavity. Moreover, it is not necessary that the partitioning flanges of either of the upper or lower plates be slightly less in depth than the depth of its respective upper or lower cavity; the only limitation being that a small gap G, which has sufficient breadth to allow the relatively free flow of uncooked waffle batter therethrough, remains between all of the co-aligned partitioning flanges when the plates are in the closed position.

As hereinbefore stated, the overall thickness of the waffle product is the summation of the depth of the upper plate in addition to the depth of the lower plate. Whereas the preferred depths of each of the plates of the present embodiment is 0.25 inches, thus yielding an overall thickness of waffle product created thereby of essentially 0.5 inches thick, this is not the limiting case. The depths of each of the cavities may be modified to yield virtually any overall waffle thickness in order to create virtually any type of waffle such as the thinner pizzella waffles having a overall thickness of approximately 0.15 inches, to the conventionally known belgian waffle having a thickness of up to approximately 0.8 inches.

The purposes and function of the partitioning flanges (20, and 24) will now be described. As shown, the flanges are disposed over the cooking surface in such as manner as to delineate a plurality of smaller sub-cavities that are each adapted for the creation of a bite-sized waffle. Each of the sub-cavities shown in the present embodiment is generally hexagonal in shape having an effective breadth B which is approximately 1.5 inches, wherein the breadth of the waffle is defined as the widest distance across the planar expanse thereof. Nevertheless, it is contemplated that waffles having an overall breadth of up to 2.0 inches may be realized, which would be easily consumable by an average person without necessitating cutting into smaller portions prior to consumption. Regarding the bite-sized waffle 31 of the present embodiment, the breadth thereof is denoted in FIG. 5 as the distance B. Nevertheless, although the bite-sized waffle of the present embodiment is hexagonal in shape, it must be appreciated that the partitioning flanges (18, and 24) may disposed over the cooking surfaces in a manner to create other shapes that may be contiguously formed such as triangles, rectangles, octagons, or the like.

Figure 4:
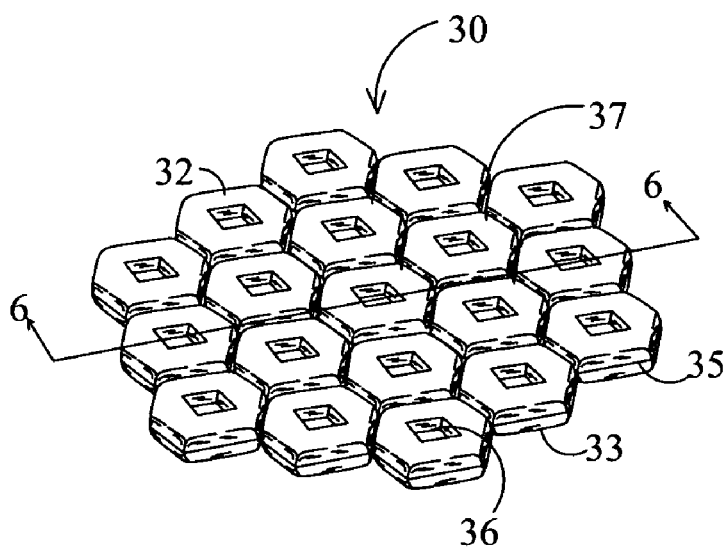
FIG. 4 is a perspective view of a waffle matrix which has been produced by the waffle making assembly of FIG. 1.
Figure 5:
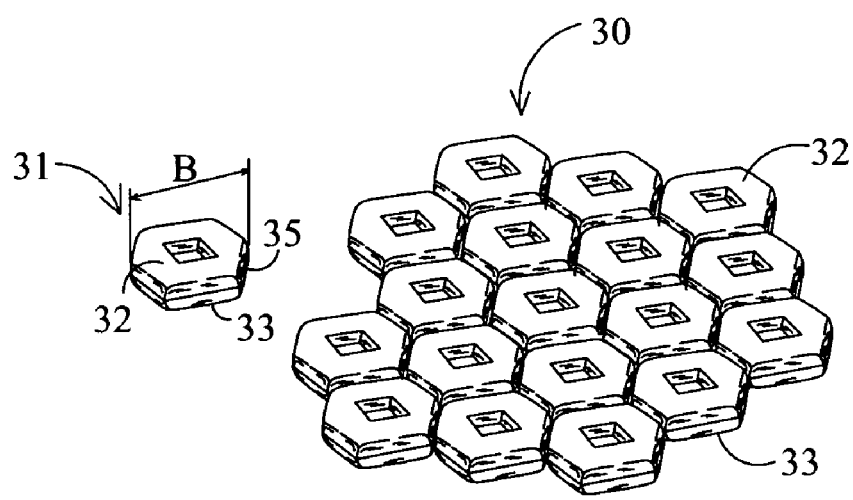
FIG. 5 is a perspective view of the waffle matrix of FIG. 4 shown with one bite-sized waffle that has been torn from the waffle matrix by hand.

As best shown in FIGS. 4 though 6, a waffle matrix 30 produced by the waffle making assembly of the present embodiment is shown, wherein the waffle matrix is sub-divideable into smaller bite-sized waffles 31 by hand. The waffle matrix has an overall size and shape that is essentially similar to the size and shape of the chamber formed by the waffle making assembly in the closed position. As shown, each bite-sized waffle within the waffle matrix has an upper and lower surface (32, and 33) that is bounded by a peripheral edge 35. The bite-sized waffles are interconnected within the matrix via a plurality of tear portions 37, which are defined by a thin region of said cooked waffle batter that extends contiguously between adjacent said bite-sized waffles in said waffle matrix, wherein the tear portions are formed by the co-aligned and opposing partitioning flanges (20, and 24) of the waffle making assembly. The thickness of the tear portion is essentially equal to the gap G formed between the opposing partitioning flanges. FIG. 5 shows a single bite-sized waffle 31 that has been separated or torn from the waffle matrix by hand. The bite-sized waffle of the present invention has one depression 36 formed in the upper and lower surfaces thereof, however it is contemplated that a bite-sized waffle may be created having a plurality of depressions formed in each surface without deviating from the spirit or scope of the present invention.

Thus as can be seen, the waffle making assembly of the present embodiment is adapted to manufacture a plurality of bite-sized waffles that are generally planar in shape, having an outer periphery which is sufficiently small to fit into an average user's mouth without necessitating severing with a fork or knife into multiple smaller pieces. Due to the advantages afforded by economies of scale, the present embodiment describes an apparatus that is capable of producing a plurality of these relatively small waffles. Nevertheless, it is to be understood that a waffle making assembly may be realized which is adapted to produce only one waffle at a time by simply not incorporating the use of partitioning flanges. Moreover, it is not necessary that the bite-sized waffle 31 of the present invention be cooked into the form of a waffle matrix for later separation therefrom, the waffle may be formed in a waffle making assembly as a singular unit. Additionally, the present embodiment describes a waffle making assembly that is adapted to produce nineteen bite-sized waffles during one cooking cycle, however it is to be appreciated that a waffle making assembly may be realized that enables the cooking of virtually any number of bite-sized waffles by simply modifying the number of partitioning flanges within each lattice of the waffle making assembly.

Figure 7:
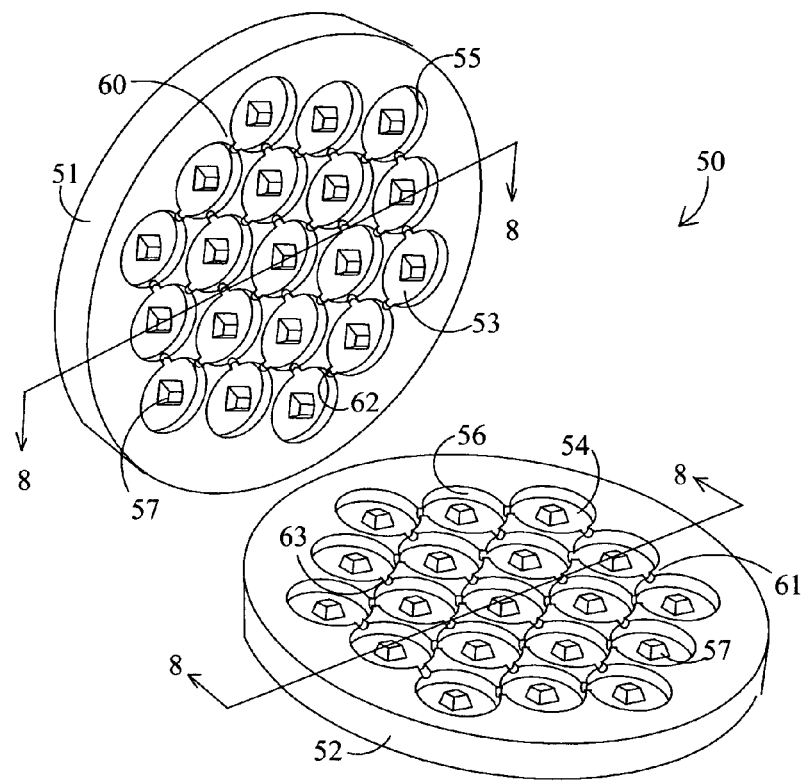
FIG. 7 is a perspective view of an alternative embodiment of the present invention shown with the upper and lower plates in the open position.
Figure 8:
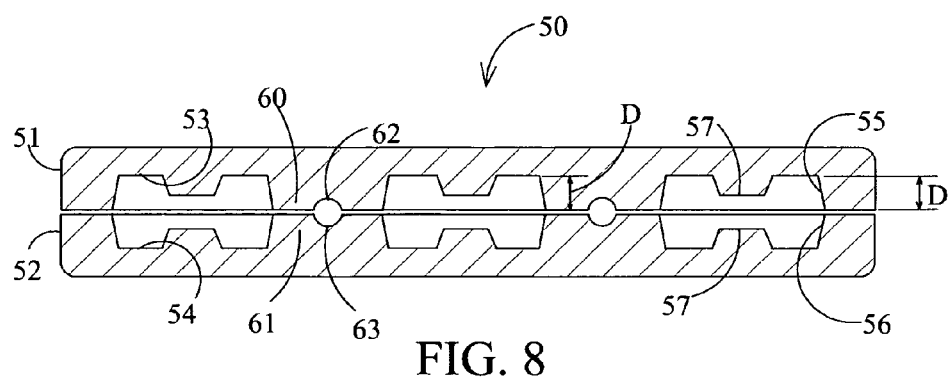
FIG. 8 is an elevational, cross-sectional view taken at 8-8 of the embodiment of FIG. 7, wherein the two plates are in the closed position.

An alternative embodiment of the present invention contemplates a waffle making assembly for the preparation of a plurality of bite-sized waffles wherein the predetermined shape thereof does not allow for the contiguous formation of the waffles within a waffle matrix. FIGS. 7, and 8 depict such an apparatus wherein the shape of the bite-sized waffle has a periphery that is generally circular in shape. Whereas the present embodiment has an upper and lower plate assembly (51, and 52), each having inner surfaces having cavities defined by cooking surfaces (53, and 54) bounded by peripheral walls (55, and 56) as well as a plurality of depression forming members 57, which are similar in design and construction to the embodiment of FIGS. 1 through 3, the present embodiment differs in that partitioning flanges (60, and 61) in the upper and lower cavities respectively extend perpendicularly to the cooking surfaces to a depth D that is essentially equal to the depth D of their respective peripheral walls (55, and 56). Another variation from the previous embodiment is a plurality of small gutters (62, and 63) that extend in between adjacent sub-cavities to provide fluid communication therebetween, thereby allowing the relatively amorphous, uncooked batter to easily flow into each of the sub-cavities during the start of the cooking operation.

As best shown in the cross-sectional view of FIG. 8, the opposing partitioning flanges (60, and 61) are adjacent each other when the plates (51, and 52) are in the closed position, therefore the amorphous batter is not allowed to flow therebetween during the cooking operation. Rather, the batter is allowed to flow through channels defined by the gutters (62, and 63), which are disposed at predetermined intervals within the upper and lower partitioning flanges. Thus, it is clearly seen how a plurality of bite-sized waffles, each having a shape that is non-contiguously alignable with other similarly shaped waffles, may be produced during only one cooking cycle.

Figure 9:
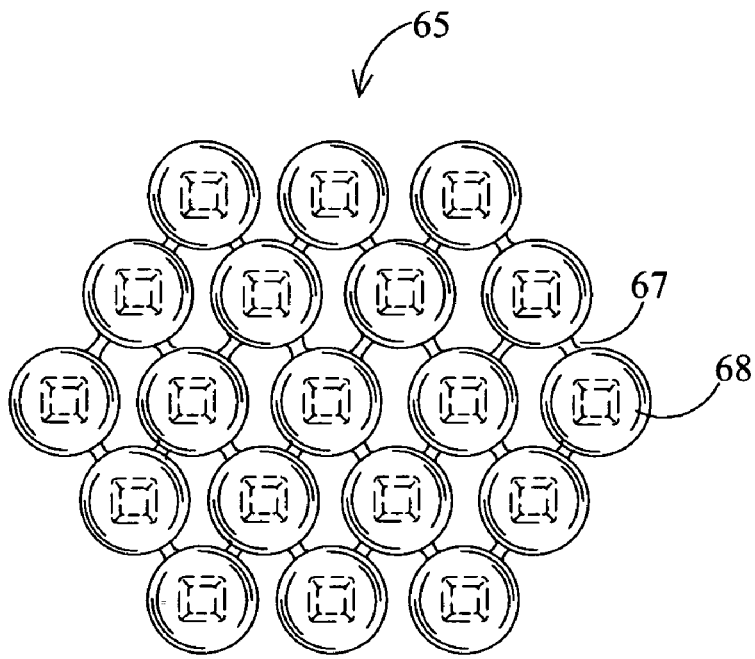
FIG. 9 is a plan view of a waffle matrix that has been produced by the waffle making assembly of FIG. 7.
Figure 10:
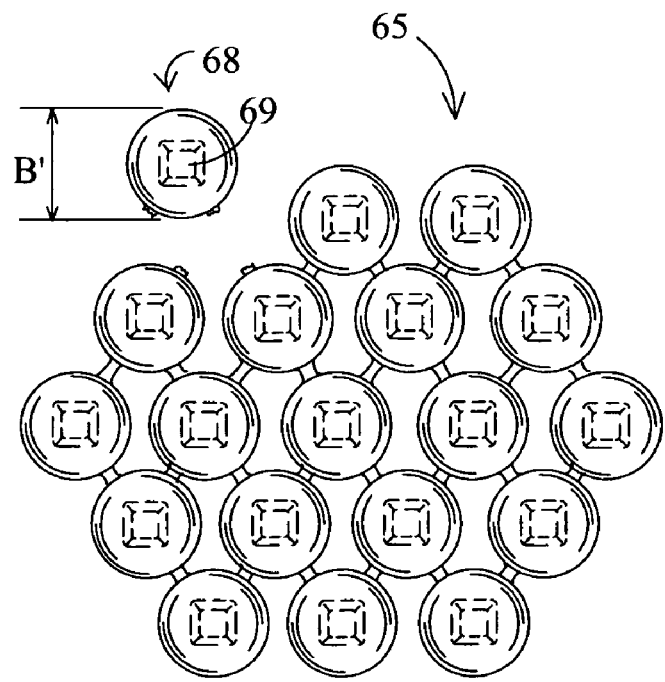
FIG. 10 is a plan view of the waffle matrix of FIG. 9 shown with one bite-sized waffle that has been torn from the waffle matrix by hand.

A waffle matrix 65 produced by the apparatus of FIGS. 7, and 8 is shown in FIGS. 9, and 10. As shown, the waffle matrix comprises a plurality of bite-sized waffles that are interconnected by a plurality of tear portions defined by generally rod-shaped fillets 67 formed therebetween. Each bite-sized waffle 68 is generally planar in shape having an outer periphery that is circular in shape, wherein the breadth B' of the waffle is defined by the diameter thereof. Similarly to the bite-sizes waffle of the previous embodiment, the breadth B' of each of the bite-sized waffles is approximately 1.5 inches, however it is contemplated that a breadth of up to 2.0 inches may be realized without necessitating cutting into smaller portions prior to consumption. Moreover, the upper and lower surfaces of the waffles have at least one depression 69 formed therein in order to provide a reservoir for condiments such as butter or syrup as well as give the prepared waffle its characteristic look and feel.

The proper cooking procedure of bite-sized waffles using the waffle making assemblies defined by the embodiment of FIGS. 1, through 3 or the embodiment of FIGS. 7, and 8 are essentially similar, therefore the use thereof will be described together. Initially, a mixture of batter is created using conventionally known waffle batter ingredients. After the waffle making plates have been warmed to a predetermined elevated temperature, a predetermined amount of batter is poured into the lower cavity and allowed to flow into all of the sub-cavities. Next, the upper plate is moved to the closed position, wherein cooking of the waffle batter continues until the waffle is fully cooked. During the cooking operation, the batter rises and thus assumes the shape of the cooking chamber. Following completion of the cooking cycle, the upper plate (11, or 51) is moved to the open position and the waffle matrix lifted from the cavity in the lower plate (12, or 52). Individual bite-sized waffles (31, or 68) may then be removed from the matrix by tearing apart the tear-portions (37, or 67) by hand.

The present invention may be embodied in other specific forms without departing from the spirit or scope of the invention. For example, waffle making assemblies that are adapted for the production of bite-size waffles having contiguously alignable shapes such as triangles, rectangles, hexagons, octagons, and the like may be implemented using partitioning flanges as well as associated gutters as described in the embodiment of FIGS. 7 through 8. That is, a waffle matrix comprised of contiguously alignable shapes may be formed having only a generally rod-shaped tear portion formed therebetween. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A waffle making assembly for creating a plurality of bite-sized waffles from a predetermined amount of conventional waffle batter, comprising:

an upper plate and a lower plate, each of said plates having an inner surface and a cavity formed within said inner surface, wherein each said cavity has a generally planar-shaped cooking surface which is surrounded by a peripheral wall having a predetermined depth, wherein said upper plate is receivable upon said lower plate in order to define a closed position wherein the peripheral wall of said upper plate is adjacent the peripheral wall of said lower plate such that said cavities in upper and lower plates define a chamber for the preparation of a waffle matrix when plates are in the closed position; and a plurality of interconnected partitioning flanges defining a lattice having an outer perimeter, wherein said lattice exists in each said cavity in order to partition said cavity into a plurality of smaller sub-cavities, each said lattice traversing across the cooking surface and the outer perimeter thereof attached to said peripheral wall, each said partitioning flange being in a generally perpendicular orientation relative to said cooking surface, wherein each said partitioning flange in said upper plate aligning with a corresponding said partitioning flange in said lower plate and forming at least one gutter that extends between adjacent sub-cavities when said plates are in said closed position;

whereby said waffle matrix produced by said waffle making assembly is separable by hand along a plurality of rod-shaped fillets created by the partitioning flanges into said plurality of bite-sized waffles.

2. The waffle making assembly of claim 1, wherein said plurality of partitioning flanges in each cavity extends generally perpendicular relative to the cooking surface of each plate to a distance which is essentially equal to said predetermined depth.

3. The waffle making assembly of claim 1, wherein the combined length of said predetermined depth of the upper and lower cavities is approximately between 0.15 and 0.8 inches.

4. The waffle making assembly of claim 1, further comprising:

a plurality of depression forming members disposed on said cooking surfaces of both said cavities, said depression forming members disposed in such as manner as to create depressions in each of said bite-sized waffles produced in said waffle making assembly.

5. The waffle making assembly of claim 4, wherein said depression forming members have a frusto-pyramidal shape.

6. The waffle making assembly of claim 1, wherein the breadth of each said bite-sized waffle is less than 1.5 inches in length.

7. A waffle matrix comprising:

a plurality of bite-sized waffles each comprising a generally planar-shaped body of cooked waffle batter having an upper and lower surface which is bounded by a peripheral edge, each said waffle having a predetermined breadth which is defined by as the widest distance across the planar expanse thereof and a predetermined thickness which is defined by the distance between the upper and lower surfaces thereof; and a plurality of rod-shaped fillets extending between adjacent waffles, each rod-shaped fillet operable to interconnect one waffle with another waffle of the plurality of waffles and allow separation of the one waffle from the another waffle by hand.

8. The edible bite-sized waffle of claim 7, wherein the breadth of said waffle is less than 1.5 inches in length.

9. The edible bite-sized waffle of claim 7, wherein the thickness of said waffle is approximately between 0.15 and 0.8 inches in length.

10. The edible bite-sized waffle of claim 7, wherein the upper and lower surfaces have depressions formed therein.

* * * * *

UNITED STATES PATENT AND TRADEMARK OFFICE
CERTIFICATE OF CORRECTION

PATENT NO. : 7,638,740 B1 Page 1 of 1
APPLICATION NO. : 11/139755
DATED : December 29, 2009
INVENTOR(S) : Veronica Hradecky It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1148 days.

Signed and Sealed this

Twenty-first Day of December, 2010

David J. Kappos
*Director of the United States Patent and Trademark Office*